United States Patent [19]

Rager

[11] Patent Number: 4,722,628

[45] Date of Patent: * Feb. 2, 1988

[54] ASSEMBLY OF RING BINDERS AND RESULTING PRODUCT

[75] Inventor: David C. Rager, Houston, Tex.

[73] Assignee: Van der Jagt 1980 Family Trust, Sugarland, Tex.

[ * ] Notice: The portion of the term of this patent subsequent to Apr. 15, 2003 has been disclaimed.

[21] Appl. No.: 922,954

[22] Filed: Oct. 24, 1986

[51] Int. Cl.$^4$ .................. B42F 13/00; B42D 3/00; B42D 3/12; F16B 19/00

[52] U.S. Cl. ........................................ 402/75; 281/29; 281/36; 411/510

[58] Field of Search ............... 402/74, 75, 31, 500; 281/29, 36, 21 A, 25 R, 25 A; 411/508, 509, 510

[56] References Cited

U.S. PATENT DOCUMENTS

| | | | |
|---|---|---|---|
| 1,035,769 | 8/1912 | Bigelow | 402/500 |
| 2,321,558 | 6/1943 | Trussell | 402/75 |
| 3,139,784 | 7/1964 | Moorman | 411/510 |
| 3,272,059 | 9/1966 | Lyday et al. | 411/510 |
| 4,295,747 | 10/1981 | Errichiello | 402/75 |
| 4,582,442 | 4/1986 | Rager | 402/75 |

Primary Examiner—E. R. Kazenske
Assistant Examiner—Paul M. Heyrana, Sr.
Attorney, Agent, or Firm—Neal J. Mosely

[57] ABSTRACT

An elongated hollow rectangular spine or backplate formed of plastic material for supporting and securing ring hardware in a loose-leaf binder has spaced, parallel, front and back walls joined at the edges and a centrally disposed strengthening rib extending between the front and back walls longitudinally for the length of the back plate. The ring hardware is secured to the backplate by inserting circumferentially grooved metal rivets through apertures in the ring hardware, pressing into the backplate rib and sonically welding the rivet therein. The circumferential grooves on the rivet shank facilitate anchoring the rivets to the backplate rib.

12 Claims, 11 Drawing Figures

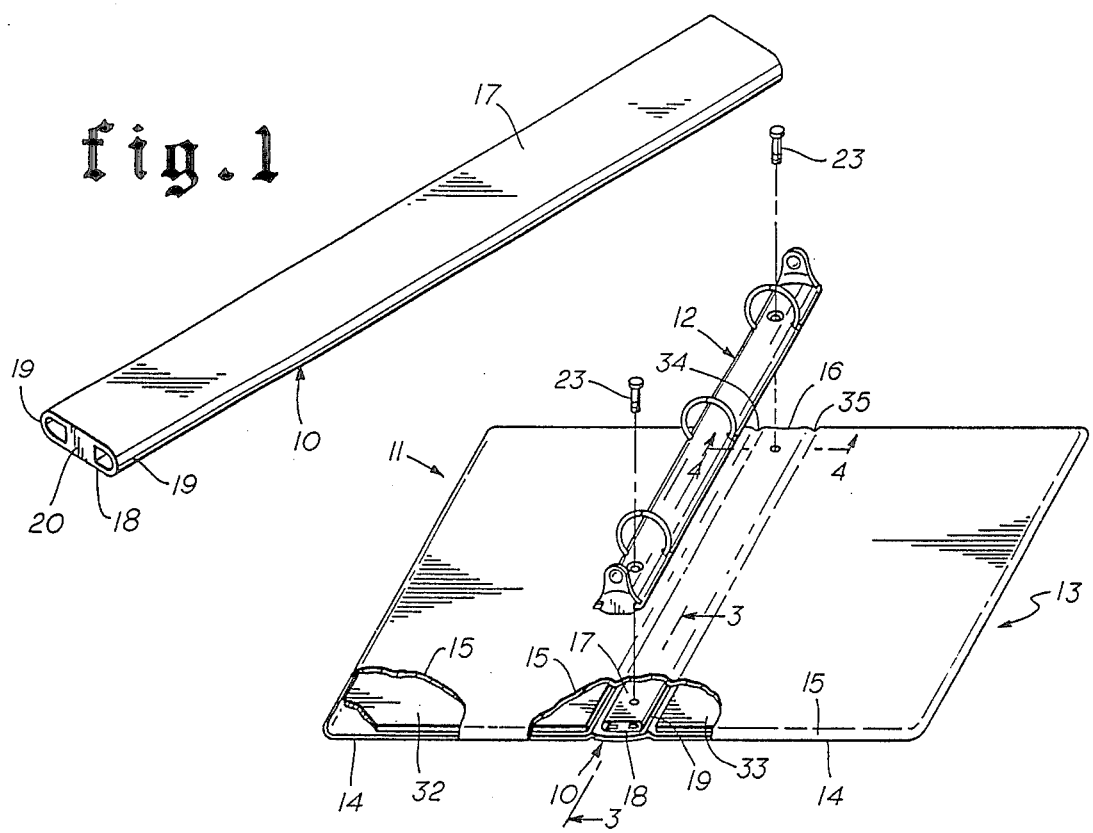
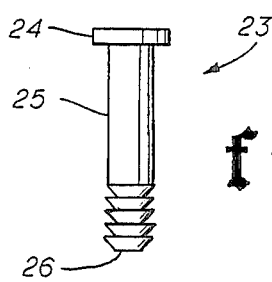
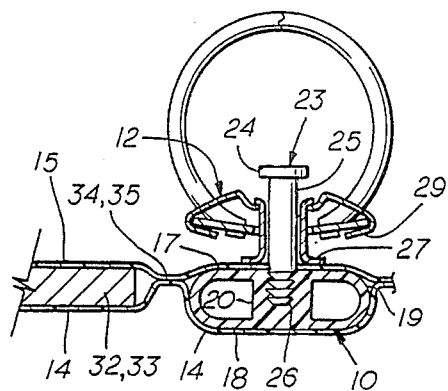
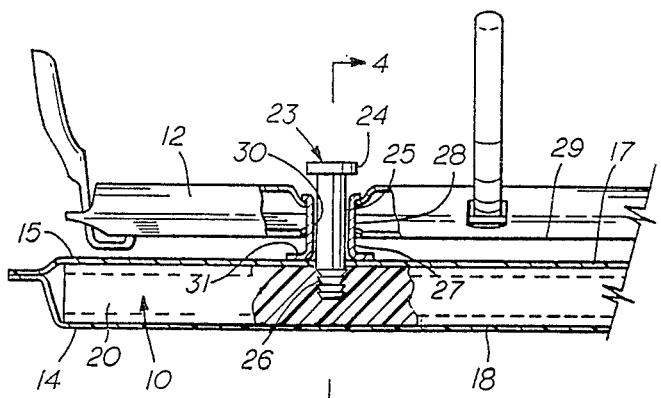

ASSEMBLY OF RING BINDERS AND RESULTING PRODUCT

BACKGROUND OF THE INVENTION

1. Field of the Invention

This invention relates to loose-leaf binders and methods of assembly thereof.

2. Brief Description of the Prior Art

This application is closely related to applicants prior application now issued as U.S. Pat. No. 4,582,442.

Conventional plastic covered binders are typically comprised of a vinyl covering formed from two sheets in overlaying relationship, that are divided transversely into two cover leaves and a central spine portion. Reinforcement, usually cardboard, is provided in each cover leaf, between the two vinyl plies, and a metal or cardboard backplate is inserted between the plies in the spine portion, to support a snap-action ring member, which is secured to the backplate with rivets.

When a vinyl cover of the above type having a metal backplate is manufactured, the backplate is inserted after the cover is fabricated. To facilitate this, a space or pocket for the metal backplate is preserved with a cardboard insert in the spine portion between the two plies.

When the two plies are sealed about the cover leaf reinforcements and between the cover leaves and the spine portion with a heat sealing mechanism, the temporary use of the nonconductive cardboard insert in place of the metal backplate prevents arcing or shortening of the electronic sealing machine used to seal the cover plies. This also avoids any damage to the vinyl that might otherwise be caused by sharp edges of the metal backplate when the vinyl plies in the hinge areas are pressed together for heat sealing. A slit is then made in the spine portion, usually across one end, to permit removal of the cardboard spacer and insertion of the metal backplate.

Cardboard backplates are sometimes used wherein the head of a conventional rivet is captured between cardboard plies to extend outwardly therefrom.

These constructions are disadvantageous, especially when it is considered that the binder is intended to be a low cost product, because the described backplates are relatively expensive and substantial labor and handling are required to both insert and remove the cardboard spacer and subsequently insert a metal backplate having extending rivets that stretch the plastic during insertion. Furthermore, the rivets used to attach the metal ring assembly against the spine portion require hand peening.

The prior art in this field illustrated by several patents which disclose plastic binder constructions having various spine assemblies to which there are secured ring mechanisms.

Beyer, U.S. Pat. No. 3,809,485 discloses a plastic backbone or spine for a loose-leaf binder with integral studs for securing a ring member and separate abutments for inhibiting movement of the ring member along the backbone. In one embodiment the backbone is insertable as a separate member between plies of a binder cover. In another embodiment it forms an integral portion of a unitary plastic loose-leaf binder cover. The studs are headed, with a slot to allow deformation and insertion into apertures of a ring member. Upon localized heating of the heads, plastic flows into the slots to prevent removal of the ring member.

McKowen, U.S. Pat. No. 3,175,847 discloses a plastic spine construction having outer and inner spine members which are secured together by a post and perforation arrangement wherein connecting posts are headed, and the heads are snapped through the perforations to provide a permanent connection between the spine members. The binder cover members are provided with a back member that is interposed between the spine members. The inner spine member provides a base for a ring assembly.

Schade, U.S. Pat. No. 2,632,657 discloses a book binder constructed of plastic material comprising stiff cover sheets of a single thickness of plastic and a central spine assembly. The spine assembly comprises a sheet metal strip laminated between two sheets of flexible plastic. A pair of longitudinally spaced hollow rivets fastened to the strip extend through holes in the inner flexible sheet. The sheets are welded along the sides of the strip to form flexible hinges. The stiff cover sheets are welded to the hinges, a ring mechanism is inserted over the rivets, and the rivets are headed to form the finished binder.

Errichiello, U.S. Pat. No. 4,295,747 discloses a one piece molded binder having a plastic spine and front and rear plastic cover panels integrally molded with the spine and hingedly connected to the spine on its inner face by living hinges. The spine has a plurality of tubular posts on its inner face on which is secured a ring mechanism by drive or clinch rivets pressed into the tubular posts.

Libby, U.S. Pat. No. 3,201,145 discloses a molded loose-leaf binder with built in hinges and flanges. The head of conventional rivets are molded into the material of the spine and their shanks extend through a base plate member. Transverse hole extend through the rivets and to receive rings which also pass through holes in the base plate member.

The prior art in general, and these patents in particular, do not disclose the novel loose-leaf binder constructed or the method of assembly of this invention.

SUMMARY OF THE INVENTION

One of the objects of the invention is to provide an improved ring binder having an improved backplate which is more easily manufactured and installed.

Another object of the invention is to provide a ring binder having an extruded plastic backplate with the ring hardware installed thereon by sonic welding.

Another object of the invention is to provide a ring binder having an extruded hollow plastic backplate with the ring hardware installed thereon by metal rivets secured by sonic welding.

Still another object of the invention is to provide an improved extruded plastic backplate for ring binders which permits the ring hardware to be installed thereon by sonic welding.

Still another object of the invention is to provide an improved hollow extruded plastic backplate for ring binders which permits the ring hardware to be installed thereon by metal rivets secured by sonic welding.

Yet another object of the invention is to provide an improved metal rivet for installing ring hardware on an extruded plastic backplate for a ring binder.

Yet another object of the invention is to provide an improved method for the manufacture of ring binders by use of an extruded plastic backplate in which the ring hardware is installed thereon by metal rivets secured by sonic welding.

Other objects of the invention will become apparent from time to time throughout the specification and claims as hereinafter related.

In this invention the backplate is initially located between vinyl plies of the spine portion of a binder during electronic sealing, and thereby eliminating the use of a spacer and the necessity of subsequently removing the spacer and inserting the backplate. The present invention provides an improved method of assembly to eliminate hand assembly of the ring hardware and peening of the conventional rivet, and wastage encountered in conventional assembly methods. This results in substantial labor savings.

The present backplate construction provides for use of circumferentially grooved metal rivets that are inserted through the rivet sleeves of the ring hardware and pressed into a centrally disposed longitudinally extending rib beneath the front wall of the backplate. Sonic welding is used to secure the rivets in the backplate rib. The rivets having a grooved shank provide a superior securing method.

When the ring hardware is placed against vinyl covered front wall of the backplate, with the rivets extending through the rivet sleeves of the ring hardware and welded inside the backplate. When viewed from the outside, the backplate of the binder has no exposed rivet heads, which detract from the appearance of many conventional binders.

As a result of the present construction, vinyl binders without exposed rivets are closely competitive in price with binders having flat cardboard backbones and exposed rivets, and are substantially less expensive than vinyl binders with metal backplates.

The above and other features and advantages of this invention will become more apparent from the detailed description that follows, when considered in connection with the accompanying drawings.

BRIEF DESCRIPTION OF THE DRAWINGS

FIG. 1 is an isometric view of a backplate for looseleaf, ring binders, constructed in accordance with the present invention.

FIG. 2 is an exploded isometric view, with parts broken away of a loose-leaf binder incorporating the present invention.

FIG. 3 is a longitudinal sectional view taken on the line 3—3 of FIG. 2.

FIG. 4 is a transverse sectional view taken on the line 4—4 of FIG. 2.

FIG. 5 is an elevational view, partially in cross section, of a rivet member in accordance with the present invention.

DESCRIPTION OF THE PREFERRED EMBODIMENT

Figure 6:
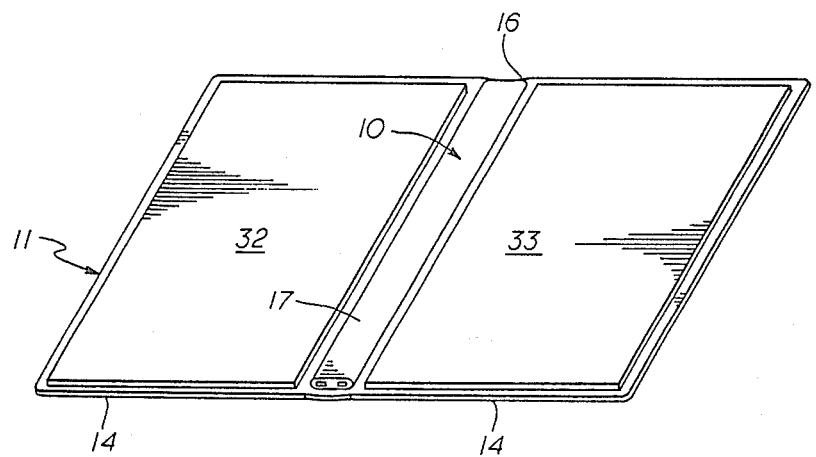
FIGS. 6, 7, and 8 are plan views, with parts broken away, illustrating the steps in the method of constructing the binder in accordance with the present invention.

Referring to the drawings by numerals of reference, there is shown a preferred loose-leaf binder construction and method of assembly thereof.

With reference to FIGS. 1 through 4, one-piece plastic spine or backplate 10 is shown for use in vinyl binder cover 11, which, along with conventional metal ring hardware 12, forms an attractive, improved loose-leaf binder 13.

The backplate 10 serves to stiffen the spine portion of the binder 13 and to secure the ring hardware 12 to the cover. The backplate 10 is placed between an outer ply 14 and an inner ply 15 of plastic sheets, typically vinyl, that are electronically sealed together to form the binder cover 11. The spline portion of the binder includes part of the plies 13 and 14 sealed longitudinally along edge portions defining a longitudinally extending sleeve or pocket in which the backplate 10 is positioned. The binder covers are flexible secured to the edges of the backplate-retaining sleeves or pocket.

The backplate 10 is an elongated hollow rectangular member of extruded plastic material adapted to extend substantially the length of a spine portion 16, and is of sufficient width to extend substantially the width of the spine portion. The backplate 10 is a hollow extrusion having parallel front wall 17 and back wall 18 joined at the edges by opposing curved side walls 19. The walls 17 and 18 are sufficiently spaced apart to establish rigidity to the spine.

A centrally disposed strengthening rib 20 extends between the front and back walls 17 and 18 and longitudinally the length of the backplate 10. The backplate 10, including the integral rib 20 is preferably extruded of a thermoplastic material of high strength and toughness, which avoids substantial brittleness at low temperatures, such as styrene. While the backplate is shown as a hollow member with a longitudinal rib, it may be a solid extrusion or a piece cut to size from a sheet of thermoplastic material.

In FIG. 5, there is shown a detail view of rivet member 23, constructed of metal material, preferably aluminum, which is used to secure the ring hardware 12 to the backplate 10. Rivet 23 comprises a head portion 24, a reduced diameter shank portion 25 extending longitudinally therefrom, and a plurality of vertically spaced, circumferential grooves 26. The grooves 26 are inwardly tapered forming ribs having flat top portions and downwardly tapered bottom portions.

Figure 10:
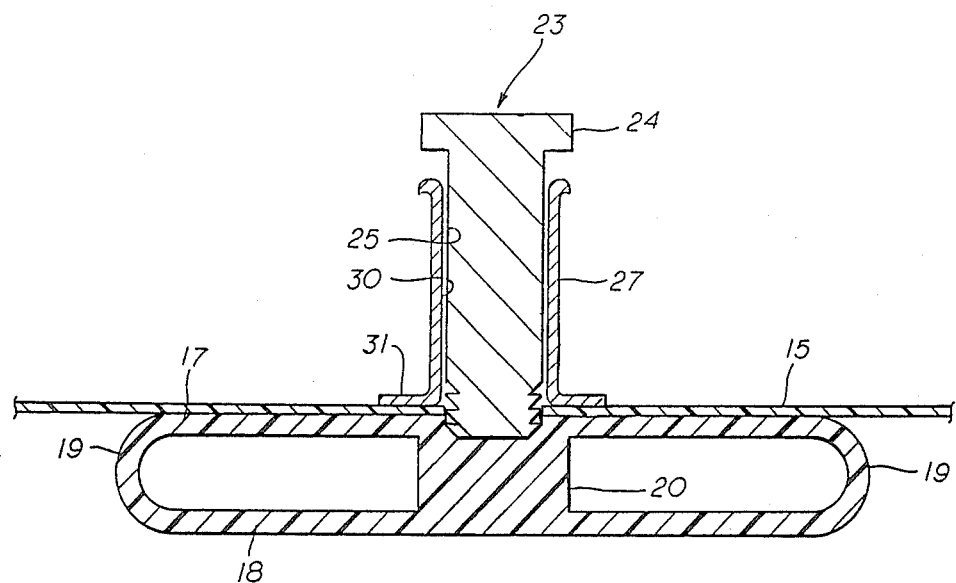
FIGS. 10 and 11 are enlarged transverse cross sectional views showing the backplate and rivet details before and after, respectively, the welding operation.
Figure 11:
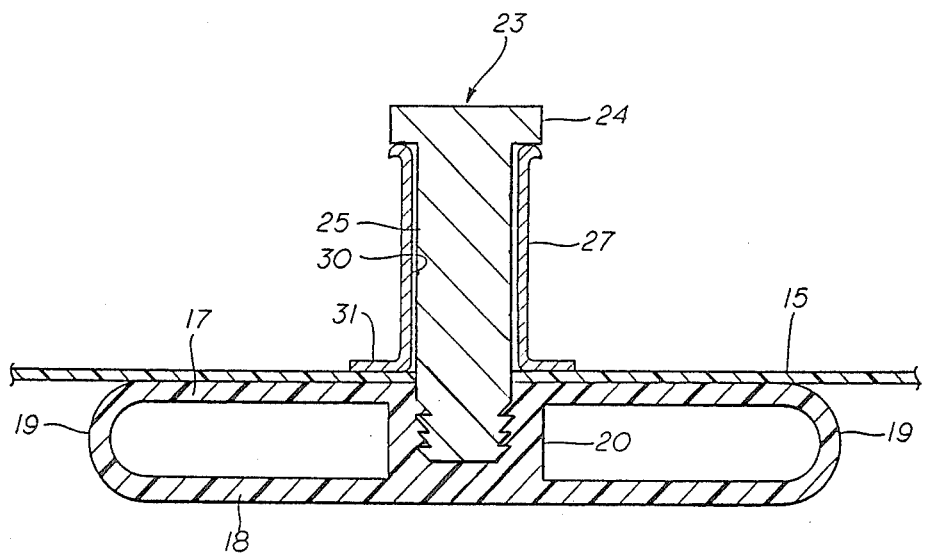

Referring now to FIGS. 3, 4, 10, and 11, the portion 25 and grooved portion 26 of the rivets 23 has a diameter which will fit closely within a standoff sleeve 27 fitted in an aperture 28 of metal base 29 of the ring hardware 12. The rivet heads 24 are of larger diameter than the inside sleeve diameter 30 to prevent removal of the ring hardware 12 therefrom.

Rivet shank 25 has sufficient length to project through standoff sleeve 27 of ring hardware 12 to be pressed into rib 20 of backplate 10. Sleeve 27 carried by ring hardware 12 has flange or flared portion 31 at base 29, adapted to seat against the backplate of the binder cover. Typically, inner ply 15 of vinyl cover 11 will be interposed between flared portion 29 and front wall 17 of backplate 10.

METHOD OF ASSEMBLY

Figure 7:
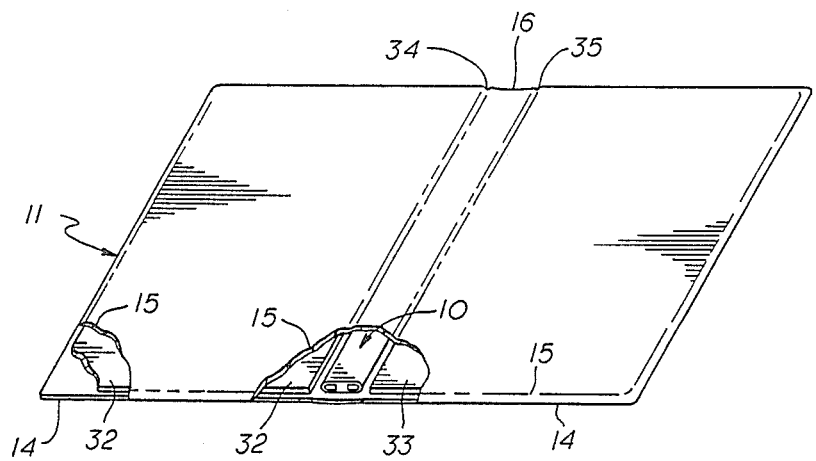
Figure 8:
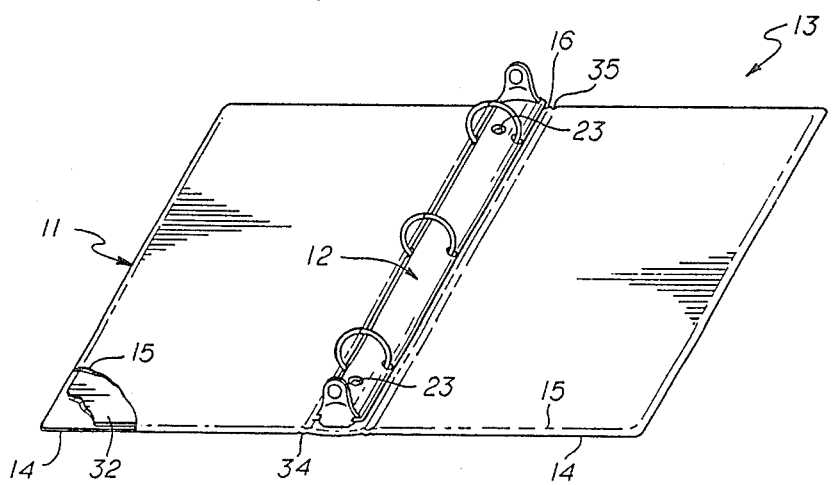
Figure 9:
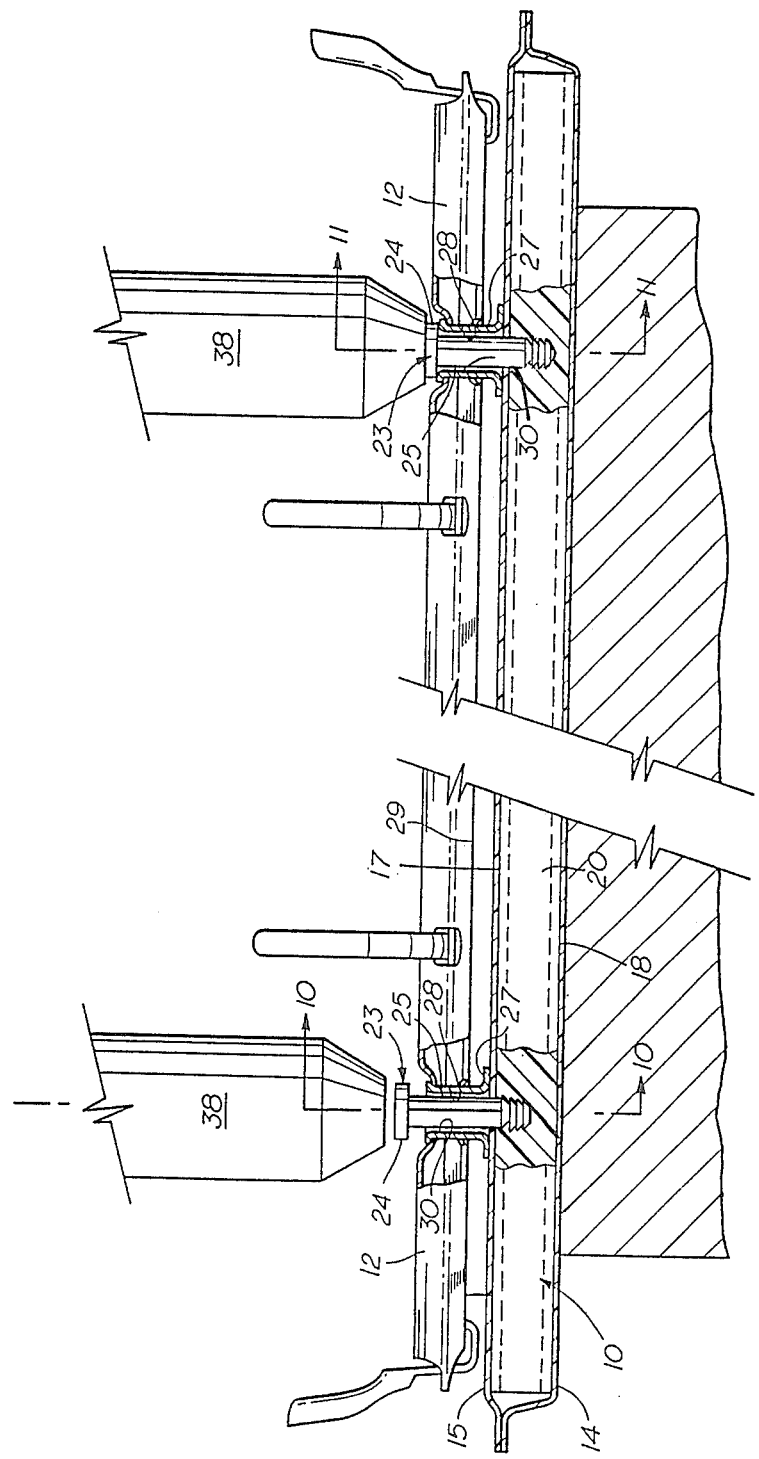
FIG. 9 is a longitudinal sectional view of the binder construction, with some parts omitted, illustrating the sonic welding operation.

The construction and assembly of the completed binder is best understood from FIGS. 3 and 4, and FIGS. 6 through 11. The outer vinyl ply 14 of the binder cover 11, is laid flat, and cardboard reinforcement sheets 32, 33 are placed on the outer ply in proper position to reinforce cover leaf portions of the binder cover. The backplate 10 is placed between the cardboard reinforcement sheets 32, 33 on the outer ply 14.

The inner vinyl cover ply 15 is placed over the outer ply 14, cardboard reinforcement sheets 32, 33 and backplate 10. Inner and outer plies 14 and 15 are then electronically sealed about the margins and along opposite longitudinal edges of the backplate, the latter serving to form hinge portions 34, 35 between the backplate and the cardboard reinforcement sheets. The absence of metal parts in the binder cover 11 substantially eliminates all danger or risk or arcing or shorting the electronic sealing machine.

The metal ring hardware 12 is attached to the vinyl binder cover by placing it over the backplate 10 and inner ply 15 with a fixture for such purpose. With the ring hardware properly positioned, the rivets 23 are placed through the standoff sleeves 27 to rest on the inner vinyl ply 15 either by hand or by a suitable fixture.

The horn 38 of a sonic welder is then brought to bear on the rivet heads 24 and activated to press the grooved portion of the shank through the vinyl ply 15 and into the strengthening rib 20 so as to extend and weld the shank of the rivet inside the rib 20. In this manner, the bottom portion of the rivet becomes permanently attached to the back wall 18 and the rib 20.

It should be noted, that as the rivet is pressed toward the ring hardware to eliminate any clearance between the head and the ring hardware, the molten plastic material of the rib 20 surrounding the rivet shank fills the grooves 26 and becomes fused integrally therewith to provide a strong thick base to the rivet.

It should be understood that the inner vinlyl ply and backplate may be provided with preformed bores and counterbores corresponding to the spacing of the rivet sleeves. Also, while the construction has been shown and described with emphasis on ring binders having covers and spline of vinyl sheet material, it is obvious that ring binders having covers and spline of fabric or other suitable materials may be manufactured in a similar manner.

While the preferred embodiments of the present invention have been described fully and completely, it will be appreciated that various modifications or alterations may be made therein, without departing from the spirit and scope of the invention set forth in the appended claims.

I claim:

1. A ring binder having a spline formed of two separable plies secured along their edges and defining a longitudinally extending flat sleeve and having covers flexible secured to each of the edges of said spline,
   an extruded thermoplastic backplate positioned in said sleeve and comprising an elongated hollow rectangular member having spaced parallel back and front walls joined at their edges by opposing side walls,
   ring hardware comprising an elongated ring supporting plate and snap rings supported thereon at selected positions,
   said ring-supporting plate having a plurality of holes spaced along its length, and
   metal rivets extending through said spaced holes and sonically welded in said thermoplastic backplate.
2. A ring binder according to claim 1 in which
   said thermoplastic backplate has a rib extending between said front and back walls and longitudinally for the entire length of said binder spline.
3. A ring binder according to claim 1 in which
   said thermoplastic backplate has a rib extending between said front and back walls and longitudinally for the entire length of said binder spline, and
   said metal rivets are sonically welded in said rib.
4. A ring binder according to claim 1 in which
   said thermoplastic backplate has a rib extending between said front and back walls and longitudinally for the entire length of said binder spline,
   said rib has a plurality of holes aligned with said ring-supporting plate holes, and
   said metal rivets are sonically welded in the holes in said rib.
5. A ring binder according to claim 1 in which
   said thermoplastic backplate has a rib extending between said front and back walls and longitudinally for the entire length of said binder spline, and
   said metal rivets have their peripheral surfaces sonically welded within said rib.
6. A ring binder according to claim 1 in which
   said thermoplastic backplate is a solid plastic sheet material underlying said ring-supporting plate holes, and
   said metal rivets extend through said ring-supporting plate holes into said thermoplastic backplate and are secured therein by sonic welding.
7. A ring binder according to claim 1 in which
   said metal rivet members each have a head portion larger than said ring-supporting plate holes to secure said ring-supporting plate against removal from said spline.
8. A ring binder according to claim 1 in which
   said rivet members each have an enlarged head portion,
   a cylindrical, longitudinal shank portion, and
   retaining means on the periphery of said shank portion for securing said rivet within said thermoplastic backplate during sonic welding.
9. A ring binder according to claim 8 in which
   said retaining means comprises a plurality of vertically spaced circumferential grooves which receive molten thermoplastic material surrounding said shaft during sonic welding.
10. A ring binder according to claim 8 in which
    said retaining means comprises a plurality of vertically spaced, inwardly tapered, circumferential grooves defining ribs having flat top portions and downwardly tapered bottom portions which receive molten thermoplastic material surrounding said shaft during sonic welding.
11. A method of producing ring binders comprising
    providing a binder cover assembly comprising a spline portion comprising two separable plies joined longitudinally along their edges to provide a longitudinally extending flat sleeve, and two covers flexible secured one along each of the longitudinal edges of said spline,
    laying said binder cover assembly flat,
    placing a backplate in said spline sleeve comprising an extruded thermoplastic elongated hollow rectangular member having spaced parallel back and front walls joined at their edges by opposing side walls,
    placing a ring hardware member comprising an elongated ring-supporting plate and snap rings supported thereon at selected positions and a plurality of holes spaced along its length over the inner ply of said spline, inserting metal rivets through said spaced holes, through said inner ply, and into said thermoplastic backplate, and sonically welding said rivets in said backplate to secure said ring hardward member thereto.

12. A method of forming loose-leaf binders according to claim 11 including the step of placing said ring hardware over the inner ply of said sleeve and said backplate member prior to inserting said rivets, placing drilling means through said ring supporting plate holes and drilling holes into backplate in alignment with said spaced holes in said ring hardware, removing said drilling means, and thereafter inserting metal rivets through said aligned holes, through said inner ply, and into said thermoplastic backplate.

* * * * *